United States Patent [19]

Grupp

[11] Patent Number: 4,904,060
[45] Date of Patent: Feb. 27, 1990

[54] LIQUID CRYSTAL DISPLAY CELL HAVING A DIFFUSELY-REFLECTIVE COUNTER ELECTRODE

[75] Inventor: Joachim Grupp, Peseux, Switzerland

[73] Assignee: Asulab, S.A., Switzerland

[21] Appl. No.: 274,551

[22] Filed: Nov. 22, 1988

[30] Foreign Application Priority Data

Nov. 23, 1987 [FR] France .................. 87 16319

[51] Int. Cl.⁴ ............................................. G02F 1/13
[52] U.S. Cl. ................................. 350/339 D; 350/336; 350/338
[58] Field of Search ............... 350/336, 338, 339 D

[56] References Cited

U.S. PATENT DOCUMENTS

| | | | |
|---|---|---|---|
| 3,756,694 | 9/1973 | Soree et al. | 350/350 R |
| 3,814,501 | 6/1974 | Schindler | 350/338 |
| 3,837,729 | 9/1974 | Harsch | 350/338 |
| 3,878,537 | 4/1975 | Roncillat et al. | 350/332 X |
| 3,881,809 | 5/1975 | Fergason et al. | 350/338 |
| 3,912,369 | 10/1975 | Kashnow | 350/347 R |
| 4,042,294 | 8/1977 | Billings et al. | 350/345 |
| 4,114,990 | 9/1978 | Mash et al. | 350/337 |
| 4,213,676 | 7/1980 | Kaufmann | 350/336 |
| 4,250,503 | 2/1981 | Shanks | 340/754 |
| 4,357,374 | 11/1982 | Ogawa | 428/1 |
| 4,418,102 | 11/1983 | Ferrato | 350/343 X |
| 4,418,987 | 12/1983 | Takanashi et al. | 350/337 |
| 4,427,978 | 1/1984 | Williams | 340/784 |
| 4,564,266 | 1/1986 | Durand et al. | 350/340 |
| 4,566,758 | 1/1986 | Bos | 350/346 |
| 4,634,229 | 1/1987 | Amstutz et al. | 350/346 |
| 4,648,691 | 3/1987 | Oguchi et al. | 350/339 D X |
| 4,697,884 | 10/1987 | Amstutz et al. | 350/334 |

FOREIGN PATENT DOCUMENTS

| | | |
|---|---|---|
| 0131216 | 6/1984 | European Pat. Off. |
| 2813007 | 9/1978 | Fed. Rep. of Germany |
| 2837431 | 4/1979 | Fed. Rep. of Germany |
| 1506570 | 4/1978 | United Kingdom |
| 2023865 | 1/1980 | United Kingdom |
| 2028529 | 3/1980 | United Kingdom |
| 2078421 | 1/1982 | United Kingdom |

OTHER PUBLICATIONS

Patent Abstracts of Japan, vol. 8, No. 133 (P-281) [1570], Jun. 20, 1984.
Published paper presented by Mr. A. H. Firester during the Society of Information Display Congress in 1987.
Patents Abstracts of Japan, vol. 4, No. 118 (P-24) [600], Aug. 22, 1980; and JP-A-55 73 023 (Suwa Seikosha K.K.)-*En entier*.
Patents Abstracts of Japan, vol. 4, No. 184 (P-41) [666], Dec. 18, 1980; and JP-A-55 127 519 (Suwa Seikosha K.K.)-*En entier*.
Patents Abstracts of Japan, vol. 8, No. 175 (P-204) [1612], Aug. 11, 1984; and JP-A-59 69 735 (Seikoushiya)-*En entier*.
SID 1984, Digest of Technical Papers, vol. 15, p. 206.
SID 1985, Digest of Technical Papers, vol. 16, p. 278.
Journal of Applied Physics, vol. 47, Sep. 1976, pp. 3842-3845.
Mol. Cryst. Liq. Cryst. 1985, vol. 122, pp. 297-308, by F. C. Saunders, et al.
Kmetz "Matrix Addressing of Nonemissive Displays", *Nonemissive Electrooptic Displays*, pp. 261-287, Plenum Press 1975.

Primary Examiner—Stanley D. Miller
Assistant Examiner—Richard Gallivan
Attorney, Agent, or Firm—Pollock, Vande Sande & Priddy

[57] ABSTRACT

In a reflector-diffuser type liquid crystal display cell, the control electrodes, which are transparent, electronic components and tracks connecting the components to the cell terminals are disposed between the cell front plate and the liquid crystal layer. The counter electrode is disposed on the other side of the liquid crystal layer and has a frosted rough light reflecting and diffusing face over its entire surface situated in the display area and thus itself functions as the cell reflector-diffuser.

12 Claims, 1 Drawing Sheet

LIQUID CRYSTAL DISPLAY CELL HAVING A DIFFUSELY-REFLECTIVE COUNTER ELECTRODE

FIELD OF THE INVENTION

This invention relates to a liquid crystal display cell of the type having a reflector-diffuser and at most one polarizer, having a liquid crystal layer between a transparent front plate and a back plate, a plurality of control electrodes in a display area between one of said plates and said liquid crystal layer, a counter electrode disposed between the back plate and the liquid crystal layer, and a plurality of electronic components each having a terminal linked to one of said control electrodes.

DESCRIPTION AND DISCUSSION OF THE PRIOR ART

In some of these cells, a dichroic dyestuff is mixed with the liquid crystal. Some of these latter have no polarizer at all (so-called White-Taylor cells), and others have a single polarizer, situated in the front of the cell (so-called Heilmeier cells).

Twisted nematic liquid crystal cells are also known which have no added dichroic dyestuff and which only have a single polarizer situated in front of the cell.

Numerous documents, for example the publication of the paper presented by Mr. A. H. Firester during the SID (Society for Information Display) Congress in 1987, patent application GB-A-2078421 and patent DE-C-2837431 describe cells of this type.

In these conventional cells, the counter electrode is transparent and is disposed on the inside surface of the front plate which is made of glass and therefore also transparent.

In addition, the control electrodes of these cells are arranged in rows and columns on the inside surface of the back plate, which is also glass, each electrode corresponding to a display point, that is to say a point which can selectively be made visible or invisible. The area where all these display points are situated in a planar view of the cell is called the display area of the cell.

In the cells described in the above-mentioned patent application and patent the electronic components associated with these control electrodes are thin-film transistors and the counter electrode is of unitary construction. This counter electrode covers the entire inside surface of the front plate or at least that part thereof which is situated in the display area of the cell.

In some of the cells described in the above-mentioned published paper, the electronic components associated with the control electrodes are elements having only two terminals, for example elements known as MIM (metal-insulator-metal) which have a current-voltage characteristic presenting a very pronounced angle at a specific voltage. In these cells, the counter electrode is formed of conductive strips parallel to one another, each situated opposite a row or a column of control electrodes and each linked to one connecting terminal of the cell.

In all these conventional cells, the electronic components are situated on the inside surface of the back plate of the cell, as well as the conducting tracks which link them electrically to the connecting terminals of the cell.

The control electrodes, the electronic components and the conducting tracks may be manufactured by one or other of various conventional photolithographic processes which have different stages of depositing and/or etching of layers of conducting, insulating or semi-conducting materials through appropriate masks.

In some of the conventional cells, such as, for example, in that which is described in the above mentioned patent DE-C-2837431, the inside surface of the back plate has been frosted at these points at which the control electrodes are situated so as to roughen their surface. In addition, these control electrodes are made of a reflecting metal, such as aluminium, and serve at the same time as a reflector and diffuser of the light which impinges on them after having passed through the cell.

It is well known that, regardless of the electronic components associated with the control electrodes of these cells, their characteristics depend to a very large extent on the thickness of the various layers of conducting, semi-conducting and/or insulating material of which they are made. Since these thicknesses are very small, the sites at which these electronic components are situated must be perfectly smooth. If they are not, the components would function incorrectly, or even not at all.

In the cell described in patent DE-C-2837431, the frosting of the back plate, which can, for example, be effected by an etching process using hydrofluoric acid, must therefore be preceded by a stage of depositing a mask that protects the places at which these electronic elements are to be situated and leaves exposed areas destined for the control electrodes.

It is well known that the viewing angle of a liquid crystal cell, that is the angle within which the information displayed by this cell can be read correctly, depends directly on the degree of roughness of the cell diffuser.

It is also known that, when a glass surface is chemically etched, its roughness increases with the depth of etching, that is with the thickness of material removed.

It has thus been found that an appropriate roughness, giving the cell a sufficiently large viewing angle, can only be attained if the depth of etching of the inside face of the back plate is greater than about 10 micrometers.

After this etching operation, the inside surface of the back plate of a cell such as that described in the above mentioned patent DE-C-2837431 thus has, at the sites at which the control electrodes are to be situated, depressions having a depth of at least 10 micrometers, separated from one another by walls.

These walls must be very thin to prevent the various visible points forming the information displayed by the cell from being separated from one another by spaces that are too large. In practical terms, their thickness should not exceed about 20 micrometers.

This structure of the back plate of the cell at this stage of its manufacture greatly complicates the subsequent stages of manufacture.

In particular, the electronic components and the conducting tracks which link these components with the connecting terminals of the cell must be situated on top of the above-mentioned walls.

It is very difficult to align the various masks used for the manufacture of these electronic components and of these conducting tracks because the tops of these walls are very narrow.

Moreover, the chemical etching mentioned above not only acts in a direction perpendicular to the surface of the plate, but also, as it is well known, in a direction parallel to this surface.

The walls separating the depressions formed by this etching are thus narrower at their bottoms than at their tops.

These walls thus present overhanging lateral faces and it is very difficult to deposit on these overhanging walls the conducting tracks which connect the electronic components situated at the top of these walls to the control electrodes situated at the bottom of the depressions.

In addition, owing to the presence of relatively deep depressions in the back plate of the cell separated by walls, the faces of which are overhanging, there is a risk that the liquid crystal material may not completely fill this cell.

An additional disadvantage of cells such as those just described stems from the fact that the liquid crystal layer of necessity has a thickness greater than the depth of the above-mentioned depressions, that is in practice a depth of about 15 to 20 micrometers. As a result, the commutation times of these cells, which is directly dependent on that thickness, are rather long, making it virtually impossible to use them when a large number of points have to be displayed.

Patent application GB-A-2078421 describes another display cell of the same type in which the control electrodes have a layer of aluminium deposited over a layer of titanium.

Electrodes of this type both reflect and diffuse, so that the back plate of the cell, on which they are disposed, does not have to be etched to roughen it. This cell therefore does not have the above-mentioned disadvantages caused by this etching process.

Nevertheless, for the control electrodes of such a cell to diffuse the light which impinges on them, it is necessary for the layers of titanium and aluminium of which they are composed to be deposited by evaporation under vacuum using very carefully defined conditions. These depositing operations by means of evaporation under vacuum are expensive, thus raising the cost of the cells.

In addition, the diffusion of light from such electrodes is not sufficient to provide these cells with a satisfactory viewing angle.

OBJECTS OF THE INVENTION

One object of the present invention is to provide a liquid crystal display cell of the hereinabove described type which does not have the disadvantages of conventional cells, i.e. which is easy to manufacture and thus cheap, the optical properties, notably the diffusion of light crossing the cell, the viewing angle and the luminosity of which are better than those of conventional cells and which has low commutation times.

BRIEF DESCRIPTION OF THE INVENTION

In the display cell of the invention, the control electrodes are transparent and situated between a front plate and the liquid crystal layer and the counter electrode is situated between the back plate and the liquid crystal layer, said counter electrode being of a light-reflecting material and being frosted over its entire surface situated in the display area, the counter electrode thus constituting the reflector-diffuser.

BRIEF DESCRIPTION OF THE DRAWINGS

The invention will now be described in greater detail with reference to the accompanying drawings, in which.

DETAILED DESCRIPTION OF THE INVENTION

Figure 1:
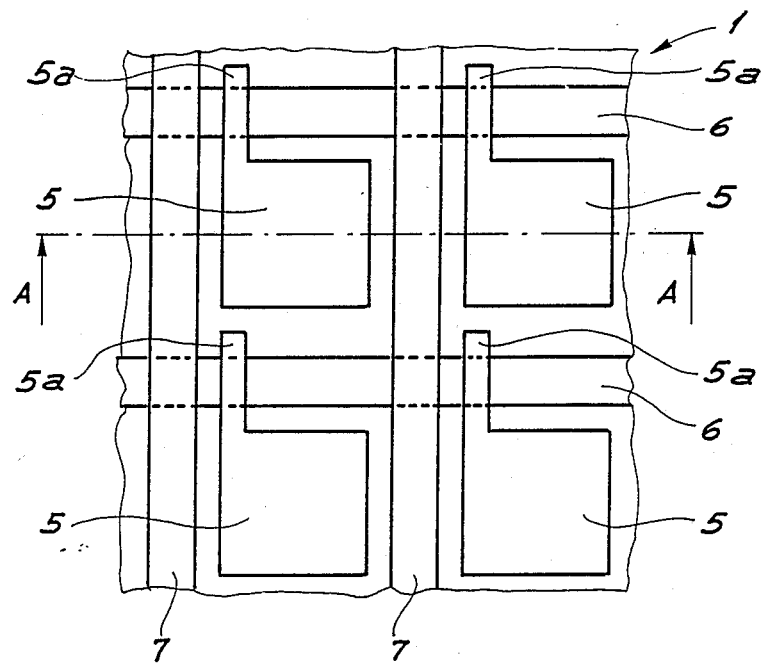
FIG. 1 is a diagrammatic and partial plan view of a display cell of the invention.
Figure 2:
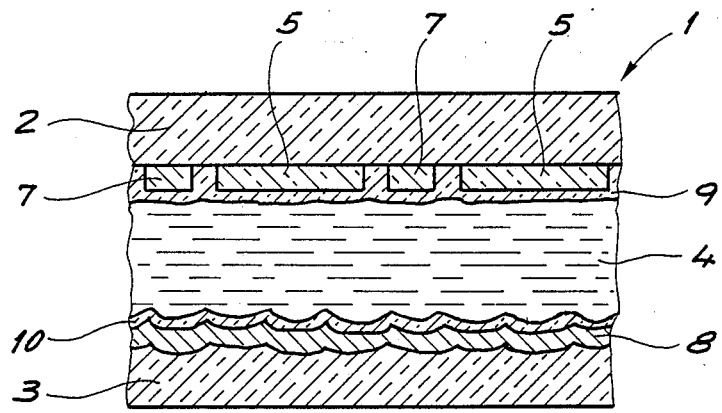
FIG. 2 is a transverse and diagrammatic section along the axis A—A of the cell of FIG. 1.

In the embodiment shown by way of example only in FIGS. 1 and 2, the display cell of the invention is given the reference numeral 1.

This cell 1 has a transparent front plate 2 and a back plate 3 which are held at a well defined distance from one another by conventional fixing means which have not been shown.

A liquid crystal layer 4 is situated between the plates 2 and 3, in the space defined by these plates and their above-mentioned fixing means.

As will become clear from the following description, the liquid crystal of this layer 4 can be of any kind and, if required, a dyestuff, for example a dichroic dyestuff, and/or a chiral compound can be admixed therewith.

The cell 1 also has control electrodes 5 which are made of a transparent, electrically conducting material such as, for example, indium oxide.

The electrodes 5 are arranged in rows and columns on the inside surface of the front plate 2, that is between the front plate 2 and the liquid crystal layer 4.

Each of these electrodes 5 is intended to cooperate in a conventional manner with a counter electrode—to be described below—to render a display point visible or invisible, with all of these display points defining the display area of the cell.

As required, this display area can extend over the entire surface of the liquid crystal layer, in a plan view of the cell, or only over part of this surface.

In FIG. 1, the electrodes 5 have been shown to have a generally square shape, but they can also be of any other desired shape.

The electronic components associated with the electrodes 5 are, in this example, thin-film MOS transistors such as those described in the article by Le Contellac et al. entitled "Transistors en couches minces pour adressage d'écrans plats à cristaux liquides" (Thin-film transistors for addressing flat liquid crystal screens) which appeared in Issue 124 of the journal "L'Echo des Recherches" edited in the second quarter of 1986 by the Service des Recherches et du Contrôle Technique de l'Administration Francaise des PTT, Paris (France).

These transistors will not be described in detail here and have not been shown in FIGS. 1 and 2.

It suffices to mention that each of these transistors has a drain linked electrically to a connection finger 5a which forms part of the electrode 5 associated with it and that it is located at the intersection, in the plan view of FIG. 1, of a conducting track 6 and of a conducting track 7.

Each track 6 forms part of a plurality of parallel tracks and links the gates of all the transistors associated with the electrodes 5 of a same row to a connection terminal, not shown, of the cell 1. To avoid photoelectric phenomena which could impair the functioning of the transistors these tracks 6 are preferably of an opaque conducting material such as aluminium.

Each track 7 forms part of another plurality of parallel tracks and links the sources of all the transistors associated with the electrodes 5 of a same column to a connecting terminal, also not shown, of the cell 1. These tracks 7 can be of any suitable transparent conducting material such as indium oxide.

Moreover, the tracks 7 are situated directly on the inside surface of the plate 2, in the same way as the electrodes 5.

The inside surface of the back plate 3 is frosted, at least over the display area of the cell, and a counter electrode 8 formed by a layer of an electrically conducting material which is a good reflector of light is disposed at least over the frosted part of this inside face.

This counter electrode 8 is sufficiently thin for its surface situated adjacent to the liquid crystal layer 4 to present substantially the same irregularities as the frosted surface of the plate 3.

It will be apparent from the following description that the inside surface of the back plate 3 can be frosted over a surface area even larger than that of the display area of the cell and it is perhaps even advantageous for this back plate 3 to be frosted over its entire surface.

It will also be apparent that the counter electrode 8 can occupy a surface larger than that of the display area of the cell, or even occupy the entire surface area of the back plate 3.

Moreover, as with virtually all liquid crystal display cells, the cell 1 has alignment layers 9 and 10 which cover the inside face of the plates 2 and 3 respectively, at least over the display area of the cell 1, as well as the various elements situated on these plates and described above.

These layers 9 and 10 are each in contact with one of the surfaces of the liquid crystal layer 4. They are designed, in conventional manner, to give well defined directions to the liquid crystal molecules which are in contact with them. They are not described in detail here because they can be of very different types, depending on the kind of liquid crystal used to realize the layer 4 and depending on the proposed manner of controlling the liquid crystal.

In some instances, the cell 1 has in addition a polarizer situated on the outside surface of the front plate 2 and which has not been shown. Such a polarizer is in particular necessary when the cell 1 is of the so-called Heilmeier type, that is when a dichroic dyestuff is mixed with the liquid crystal of the layer 4 and when the alignment layers 9 and 10 are such that the liquid crystals in contact with them are all arranged parallel to the plates 2 and 3 and, depending on the situation, parallel or perpendicular to the direction of polarization of the polarizer.

The cell of the invention, one embodiment of which has just been described, has various advantages in comparison to conventional cells such as those described in the above mentioned patent DE-C-2837431.

One of these advantages resides in the fact that the inside surface of the back plate 3 is frosted over its entire surface, at least in the display area of the cell. The chemical etching process needed to frost this plate is thus very much easier to carry out than in the cell described in the above-mentioned German patent in which this etching must only be effected at the locations of the control electrodes, these locations being separated by areas which have to be not etched.

Moreover, this chemical etching can be carried out for the entire time necessary to obtain sufficient roughness to ensure that the viewing angle of the cell is as large as required.

Indeed, the depth of the etching, that is the thickness of the layer of material removed during this etching process can be of any size and can, if necessary, reach several tens of micrometers without complicating, or even rendering impossible, subsequent steps in the manufacture of the cell.

Moreover, the counter electrode 8 can be made of silver and can be deposited on the inside surface of the back plate 3, after the latter has been frosted, by a conventional, purely chemical process that is very easy to carry out and appreciably cheaper than the process of depositing under vacuum which has of necessity to be used to deposit the electrodes of the conventional cell described in the above-mentioned German patent.

A further advantage of the cell of the invention in relation to that which is described in this German patent resides in the fact that the plate on which the electrodes 5 and the transistors associated therewith are situated, i.e. the front plate 2, does not need to be frosted, and is thus perfectly planar.

The manufacture of the various elements situated on this plate 2 is thus much easier than that of the corresponding elements of the cell described in this German patent because these latter are situated on a plate, in this case the back plate of the cell, which is not planar.

When the plate 3 is frosted over its entire surface, the cell of the invention also has the advantage that the thickness of the liquid crystal layer 4 does not depend on the depth to which it was necessary to etch the plate to obtain the desired degree of roughness.

This thickness of the liquid crystal layer 4 can therefore be small, as a result of which the commutation times of the cell can also be small and the number of display points of this cell can therefore be very great.

In comparison to the display cell described in the above-mentioned patent application GB-A-2078421, the cell of the present invention also has the advantage of being able to be manufactured in a simpler manner and hence of having a lower cost price.

This advantage is notably due to the fact that in the cell of the invention, the control electrodes 5 and the conducting tracks 7 can be manufactured simultaneously by a single chemical etching of a layer of indium oxide deposited on the surface of the front plate 2, whereas in the conventional cell, the conducting tracks corresponding to these tracks 7 and the control electrodes have to be manufactured separately, these latter moreover having to be manufactured by evaporation under vacuum which is a costly operation.

Moreover, the viewing angle of the cell of the invention is greater than that of the cell described in patent application GB-A-2078421.

This advantage derives from the very good diffusion of light by the counter electrode which is due to the substantial roughness of the inside face of the back plate 3.

In the cell which has just been described and which is shown in FIGS. 1 and 2, the electronic components associated with the electrodes are thin-film transistors. It is apparent that all the advantages of the cell of the invention are retained if these electronic components are other components having three terminals, such as thyristors, or components having two terminals, such as the already mentioned MIM elements.

In addition, still with reference to the cell shown in FIGS. 1 and 2, the function of light reflection and diffusion is ensured by the counter electrode 8 itself. All the advantages of the cell of the invention are, of course, also retained if the counter electrode 8 is transparent and if the function of light reflection and diffusion is ensured by a reflective layer situated on the inside frosted face of the back plate 3, between this latter and this transparent counter electrode and/or if the counter electrode 8 is formed of separate parallel bands, as is the case when the electronic components associated with the control electrodes are components having two terminals, such as MIM elements.

It should be noted that, in the latter case, the inside surface of the back plate of the cell can also be frosted between the bands forming this back electrode in such as way that the operation of frosting this back plate is not more complicated than in the case in which the back electrode is of a single piece.

It should also be noted that the presence of the control electrodes, electronic components and tracks linking these latter to the connection terminals of the cell according to the present invention on the inside face of the front plate thereof does not—as could have been feared—reduce the brilliance of this cell as compared to that of conventional cells.

On the contrary, the fact that the back plate of the cell does not have the above-mentioned elements allows for greater freedom of choice in the characteristics of the reflector-diffuser formed by this back plate and the counter electrode and to increase, if necessary, the brilliance of the cell in relation to that of conventional cells.

It is obvious that many modifications can be made to the cell that has just been described without causing the thus modified cell to fall outside the scope of the present invention.

Thus, for example, the inside face of the back plate 3 can be planar and the counter electrode 8 can be frosted after having been deposited on this planar face.

A cell constructed in this manner has the same advantages as the cell described above with reference to FIGS. 1 and 2.

I claim:

1. A liquid crystal display cell of the type having a reflector-diffuser and at most one polarizer, comprising
    a first transparent plate,
    a second plate,
    a liquid crystal layer disposed between said first and second plates,
    a plurality of transparent control electrodes disposed between said first transparent plate and said liquid crystal layer in a display area,
    a plurality of electronic components connected each to one of said control electrodes, and
    a counter electrode situated between said second plate and said liquid crystal layer, said counter electrode being of light-reflecting material and having irregularities over its entire surface situated in said display area so as to reflect and diffuse impinging light, whereby said counter electrode is also said reflector-diffuser.

2. A display cell according to claim 1, wherein said counter electrode contacts the face of said second plate oriented towards said liquid crystal layer.

3. A display cell according to claim 2, wherein said face of the second plate oriented towards the liquid crystal layer is frosted over its entire surface and said counter electrode presents substantially the same irregularities as said frosted face of said second plate.

4. A display cell according to claim 2, wherein the face of said counter electrode located adjacent to said liquid crystal layer is frosted over its entire surface situated in said display area.

5. A display cell according to claim 3, wherein said first plate is disposed in front of said cell, said control electrodes are disposed on said first plate, and said electronic components are disposed on said first plate between the latter and said liquid crystal layer.

6. A display cell according to claim 5, wherein said control electrodes are disposed in rows and columns, wherein a first and a second plurality of conductive tracks are disposed on said first plate between the latter and said liquid crystal layer and electrically isolated from each other, each track of said first plurality of tracks being disposed between two adjacent rows of said control electrodes and each track of said second plurality of tracks being disposed between two adjacent columns of said control electrodes, and wherein each of said electronic components is further connected to one track of said first plurality of tracks and to one track of said second plurality of tracks.

7. A display cell according to claim 1, wherein said first plate is disposed at the front of said cell, said control electrodes are disposed on said first plate, and said electronic components are disposed on said first plate between the latter and said liquid crystal layer.

8. A display cell according to claim 7, wherein said control electrodes are disposed in rows and columns, wherein a first and a second plurality of conductive tracks are disposed on said first plate between the latter and said liquid crystal layer and electrically isolated from each other, each track of said first plurality of tracks being disposed between two adjacent rows of said control electrodes and each track of said second plurality of tracks being disposed between two adjacent columns of said control electrodes, and wherein each of said electronic components is further connected to one track of said first plurality of tracks and to one track of said second plurality of tracks.

9. A liquid crystal display cell having a reflector-diffuser and at most one polarizer, comprising a layer of liquid crystal situated between a first transparent plate and a second plate, a plurality of control electrodes disposed in a display area between one of said plates and said liquid crystal layer, a counter electrode disposed between the other of said plates and said liquid crystal layer and a plurality of electronic components each linked to one of said control electrodes, wherein said control electrodes are transparent and disposed between said first plate and said liquid crystal layer, wherein said counter electrode is disposed between said second plate and said liquid crystal layer and is of a light reflecting material, and wherein the face of said counter electrode located adjacent to said liquid crystal layer is frosted over its entire surface situated in said display area, said counter electrode thus constituting said reflector-diffuser.

10. A display cell according to claim 9, wherein said first plate is disposed at the front of said cell, said control electrodes are disposed on said first plate, and said electronic components are disposed on said first plate between the latter and said liquid crystal layer.

11. A display cell according to claim 10, wherein said control electrodes are disposed in rows and columns, wherein a first and a second plurality of conductive tracks are disposed on said first plate between the latter and said liquid crystal layer and electrically isolated from each other, each track of said first plurality of tracks being disposed between two adjacent rows of said control electrodes and each track of said second plurality of tracks being disposed between two adjacent columns of said control electrodes, and wherein each of said electronic components is further connected to one track of said first plurality of tracks and to one track of said second plurality of tracks.

12. A display cell according to claim 9, wherein said counter electrode contacts the face of said second plate oriented towards said liquid crystal layer.

* * * * *